Dec. 17, 1935.　　　G. F. McDOUGALL　　　2,024,698
POWER TRANSMISSION
Filed June 11, 1934　　　2 Sheets-Sheet 1
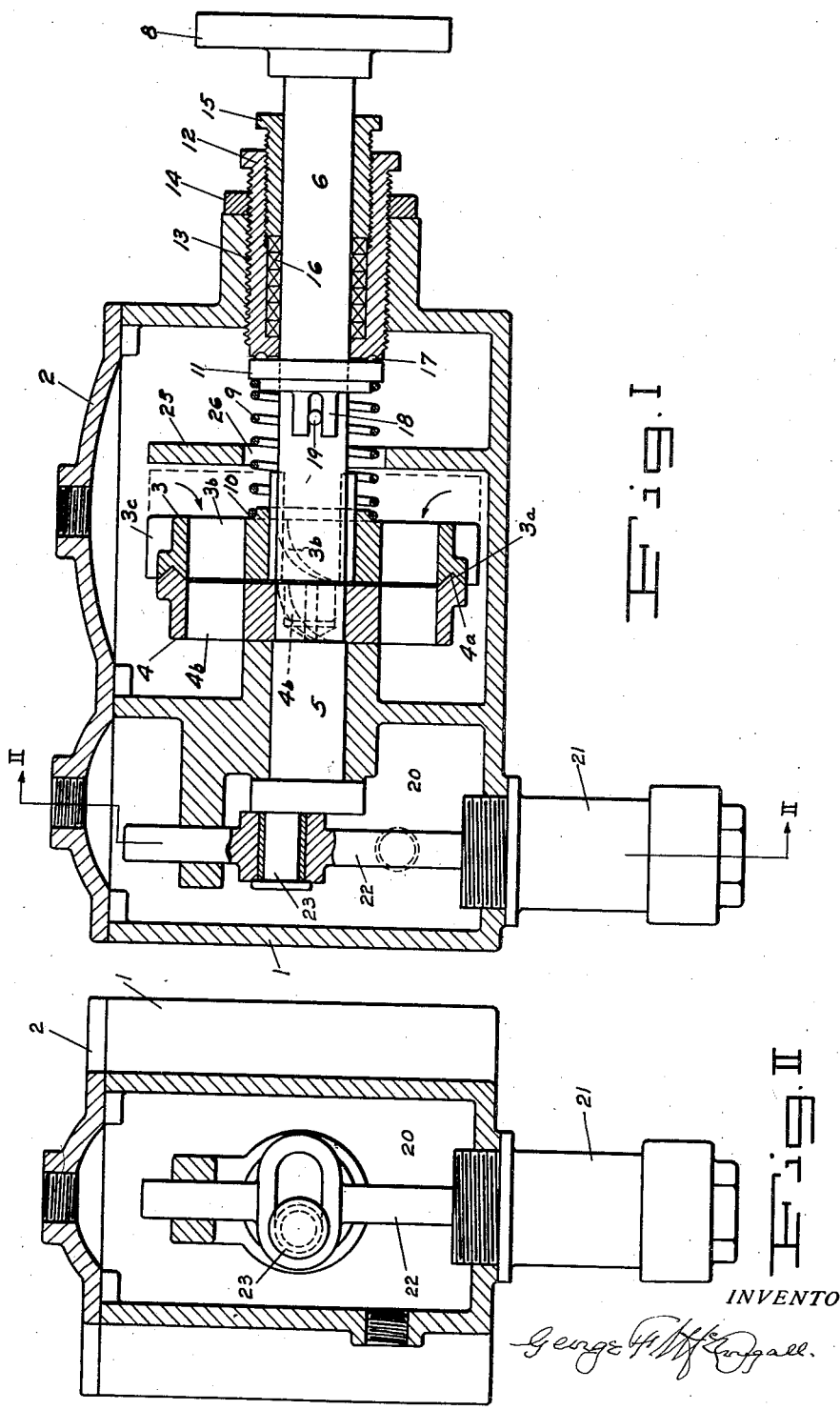
INVENTOR
George F. McDougall.

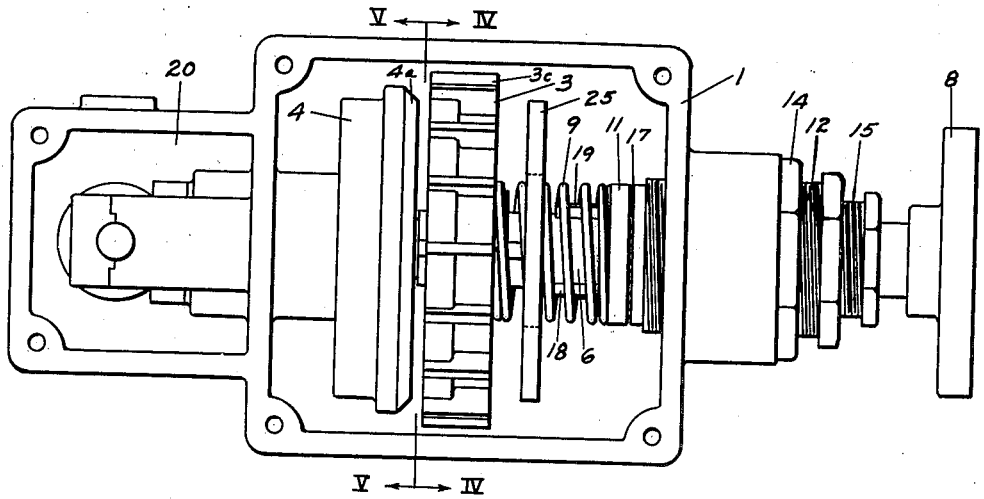
Fig. III
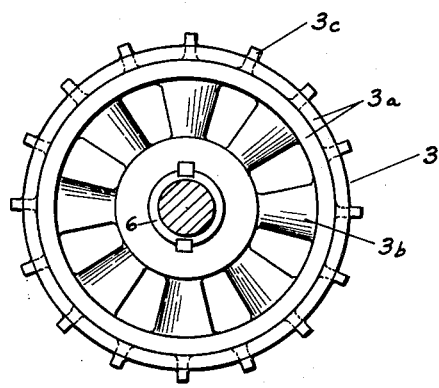
Fig. IV
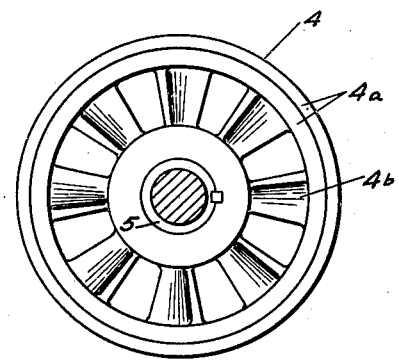
Fig. V

Patented Dec. 17, 1935

2,024,698

UNITED STATES PATENT OFFICE 2,024,698

POWER TRANSMISSION

George F. McDougall, Portland, Oreg.

Application June 11, 1934, Serial No. 730,060

19 Claims. (Cl. 192—57)

My invention relates to clutches, speed reducing devices and to hydraulic transmission mechanisms.

A principal object of my invention is a device to prevent overloading of a driven mechanism, such as a fuel pump or an electric generator by limiting applied power when the same receives its energy from such a prime mover as an automobile engine and where the driven mechanism is required to function efficiently at the lowest as well as at extreme high speed of such prime mover.

A further important object is a device that utilizes a frictional drive at low speeds and up to a variable speed limit and will then change automatically to a hydraulic drive wherein the energy from the prime mover is transmitted to the driven mechanism by means of the kinetic energy of a flowing fluid.

An object dependent on the one just stated above is a mechanism adapted to utilize a fluid of unusual gravity, viz. a mercury-oil mixture of selected proportions, to attain the density and develop the torque required, together with means for maintaining such a mixture in a substantially uniform mixed condition while it is being used for the purpose indicated.

Other beneficial objects will be immediately apparent to those skilled in the science of mechanical engineering and the art of power transmission. Since they are in considerable number they will be best understood by study of the detailed specification and the drawings accompanying the same.

The following drawings accompany and form a part of this invention, being partly diagrammatic as will be hereinafter explained.

In the drawings,—

Fig. I represents a vertical section of my new invention with which is incorporated a diagrammatic representation of a pump, the pump merely being shown as illustrative of a device to be driven by the invention;

Fig. II is a sectional end view on the line II—II of Fig. I;

Fig. III is a plan of Fig. I;

Fig. IV is a section on the line IV—IV of Fig. III; and

Fig. V is a section on the line V—V of Fig. III, being a reverse view from the same position showing Fig. IV.

To make use of this invention the fluid container 1 will be filled nearly full with a fluid that is a mixture of oil and mercury in any desirable proportions or it may be nearly all mercury if a very large torque is required.

The drive is transmitted by means of the clutch elements 3 and 4, 3 being a pump provided with vanes, 3b, and 4 being a turbine provided with vanes, 4b. 3 is also provided with a friction surface 3a and 4 is provided with a friction surface 4a that are normally in contact under the influence of the spring 9, when the driving shaft 6 is running at low speed or at rest.

The spring 9 is adjusted by means of the tube 12 which is threaded into the container 1 at 13 and is provided with a lock-nut 14 to retain any selected adjustment. Ball bearings 17, will be interposed between the tube 12 and the thrust collar 11, and the thrust collar 11 is prevented from applying a twist to the spring 9 by the pin 19 and the carrier 18. The spring 9 bears against the clutch element 3 at 10, and a stuffing box containing packing 16 and a gland 15 serve to retain the liquid in the container 1 in the well known manner. The half coupling 8 diagrammatically represents driving means such as a connection to a high speed prime mover. The clutch element 4 is fixedly mounted on the shaft 5 and is diagrammatically represented as having a useful load by the crank pin 23, the pump rod 22, the pump barrel 21 and the liquid chamber 20.

A partition 25, having an opening 26, is positioned a short distance from the clutch element 3. This partition, such as 25, may be made movable for different adjustments of the device, if desired.

Upon starting of the motor driving the shaft 6 and during low speed operation of the same, the frictional surfaces 3a and 4a will function to drive a driven mechanism, such as a pump, the same speed as the prime mover. As soon as the speed increases, the flow of fluid in the direction of the arrows in Fig. I will cause a hydraulic reaction on the pump vanes such as 3b and the friction surfaces 3a and 4a will separate by overcoming the spring 9, but the fluid flow through the pump vanes 3b will cause a like movement of the turbine vanes 4b in the same direction, if the vanes are pitched as shown in the drawings.

As the speed of the shaft 6 increases the reaction on the vanes 3b will likewise increase, further compressing the spring 9 and withdrawing the clutch element 3 further from the clutch element 4, thus to some extent decreasing the influence of fluid flow past the vanes 3b and impinging on the vanes 4b. This influence is thought to decrease inversely as the 3/2 power of the distance between the clutch elements. The parasitic friction on the surface of the element 4 will increase as the square of its speed, further tending to prevent overspeeding. The total force of the fluid delivered by the pump to the turbine can never exceed the force necessary to compress the spring 9 nor be substantially less than that amount.

This condition is shown to exist in Fig. II where the clutch elements 3 and 4 have separated a short distance and will be presumed to be running. As the speed of the prime mover or the shaft 6 further increases, the clutch element 3 will further compress the spring 9 and retreat toward the position shown in dotted outline in Fig. I whereupon the fluid supply to the pump vanes 3b is restricted and impaired by the presence of the partition 25, thus preventing further retraction of the clutch element 3 since it proportionately impairs the reaction on the pump vanes 3b which, as explained, is the cause of the retractile movement of the clutch element 3.

Radial vanes 3c are shown attached to the perimeter of the clutch element 3, their purpose being to agitate the oil-mercury mixture and keep the mercury in suspension.

To first mix the oil and mercury when the device is originally charged with fluid will require quite rapid agitation. The oil should be a light oil, and once mixed the mixture returns very easily into a mixed condition upon restarting of the device. It will still separate to some extent when the device is at rest but may be mixed readily again upon starting.

Thus it is seen that we have here a driving clutch, and if for example it is intended to operate a pump as shown, the pressure delivered by the pump will be a function of the adjusted strength of the spring 9 and has nothing to do with the speed of the prime mover 8 if that speed goes above a certain fixed point.

If the prime mover represented by 8 continues to run at a slow speed the friction surfaces 3a and 4a will slip, running in oil they will not be damaged. If the device is connected to a generator such as is used on an automobile the ultimate output of the generator will be a function of the adjusted strength of the spring 9 and the generator cannot be overheated by excessive power.

This invention is not intended to be especially economical of power but is intended for use where problems of power control are of importance and the question of economy is subordinate. Some additional possibilities of power control are to be found in the design of the respective vanes in the pump and turbine.

No further attempt will be made to explain the great number of uses to which this new invention is applicable since it would make this description unduly long and it is believed the foregoing two examples are sufficient. Therefore, having fully disclosed my invention so that anyone skilled in the art to which it belongs can make and use the same, what I claim as new and desire to secure by Letters Patent, is—

1. A fluid clutch comprising in combination a driven turbine member and a retractile pump member alined therewith that are adapted for initial frictional engagement; fluid supply means for the pump and a spring adapted to initially engage the pump with the turbine and oppose retractive effect due to hydraulic reaction of the fluid passing through the pump.

2. The combination according to claim 1 and including automatic means to diminish fluid supply to the pump to limit the retractive movement of said pump.

3. In a fluid clutch comprising in combination a driven turbine member and a driving pump member alined therewith, a surrounding fluid container for the pump and turbine, hydraulic means adapted to induce retractile movement of the pump with respect to the turbine, means limiting fluid supply to the pump upon retraction thereof and spring means opposing retraction of the pump.

4. In a fluid clutch, a rotary pump and a turbine adapted to rotate under the influence of fluid delivered by the pump, a fluid supply means associated with the pump and turbine, means for retracting the pump from the turbine under the influence of hydraulic flow therethrough and means for automatically restricting fluid supply to the pump.

5. In a fluid clutch, a rotary pump and a turbine adapted to rotate under the influence of fluid delivered by the pump, a fluid supply means associated with the pump and turbine, means for retracting the pump from the turbine under the influence of hydraulic flow and means for controlling fluid supply to the pump.

6. In a fluid clutch, a rotary pump member and a rotary turbine member positioned respectively to deliver and receive hydraulic flow, spring means for initially maintaining the members in frictional engagement, said spring means being adjusted to yield to the hydraulic reaction of flow to separate the pump and turbine, and means effective to restrict the flow of fluid upon yielding of the spring.

7. In a fluid clutch mechanism, a rotary pump member, vanes in the pump, a turbine positioned to receive flow from the pump, vanes in the turbine, spring means for initially holding the pump and turbine in frictional engagement for like rotation, the said spring means being adjusted to permit increasing separation of the pump from the turbine proportional to the hydraulic reaction between the pump and turbine.

8. The combination according to claim 7 in which means are provided for adjusting the strength of the spring.

9. In a fluid clutch mechanism, a driven rotary pump member, vanes in the pump, a vane type turbine adapted to rotate under the influence of flow from the pump, spring means for initially holding the pump and turbine in frictional engagement, the said spring means being adjusted to yield to hydraulic reaction of flow to separate the pump and turbine, and a shield positioned to restrict flow of fluid to the pump upon further yielding of the spring.

10. In a fluid drive transmission, a vane pump, a vane turbine adapted to receive fluid from the pump, a liquid containing chamber in which the pump and turbine are mounted and means operable by hydraulic reaction that are effective to vary the distance between the pump and turbine in proportion to the power delivered by the pump.

11. In a fluid drive transmission, a retractile vane pump, an opposed vane turbine, a liquid chamber in which the pump and turbine are mounted and means operable by hydraulic reaction of fluid passing through the pump effective to vary the distance between the pump and turbine.

12. In a fluid clutch, a turbine and an opposed pump, fluid supply means for the pump, a mounting for the pump arranged to permit retractile movement of the pump under hydraulic reaction, a spring opposing retractile movement and a baffle arranged to restrict fluid supply to the pump upon yielding of said spring.

13. A fluid clutch drive comprising in combination a driving pump member and a driven turbine member arranged to receive hydraulic energy from the pump, a fluid reservoir arranged to contain the pump and turbine, means permitting retractile movement of the pump to limit the power delivered to the turbine and means for restricting supply of fluid to the pump to further limit the speed of the turbine.

14. In a fluid clutch arranged to permit varying speeds of driving and driven members, a driven clutch member, turbine vanes associated with said driven member, a driving clutch member, pumping vanes associated therewith and arranged to deliver fluid to rotate the driven member, a fluid supply reservoir within which the driving and driven members are contained, and means associated with the driving member that are adapted to control the fluid supply to the pumping vanes in inverse ratio to the speed of the pump.

15. In a transmission mechanism comprising in combination a rotary pump and a turbine adapted to be driven by flow from the pump, automatic means for decreasing the supply of fluid to the pump in proportion to the speed thereof and manual means for adjusting the automatic means.

16. In a fluid clutch adapted to utilize hydraulic flow of heavy fluid impelled by a driving member to impart motion to a driven member, a reservoir within which driving and driven members are operably mounted and means operable by the driving member to agitate the fluid in the reservoir.

17. A hydraulic transmission comprising in combination a pumping mechanism, a fluid driven mechanism adapted to receive energy from the pump, a fluid supply means for the pump and means within the last named means for maintaining a contained fluid in a state of uniform mix while the transmission is in operation.

18. In a transmission of the character described, a liquid chamber, a revoluble shaft penetrating said chamber, a retractile propeller mounted within the chamber that is arranged to revolve with the shaft, a spring positioned to oppose retraction of said propeller and means positioned to impair fluid flow to the said propeller upon retraction thereof by overcoming the spring.

19. A power transmission mechansm defined in part as a fluid pump, means for driving the pump, a fluid motor arranged to receive hydraulic power from the pump, a fluid supply for the pump and means governing said fluid supply that are operable by hydraulic reaction of fluid passing through said pump.

GEORGE F. McDOUGALL.